(12) United States Patent
Chujo et al.

(10) Patent No.: US 12,080,900 B2
(45) Date of Patent: Sep. 3, 2024

(54) POWER STORAGE DEVICE (71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Yuki Chujo, Kariya (JP); Takayuki Hirose, Kariya (JP); Tomohiro Nakamura, Kariya (JP); Masahiro Yamada, Kariya (JP); Nobuyasu Haga, Seto (JP); Motoyoshi Okumura, Nagoya (JP); Takuro Kikuchi, Tokyo (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 777 days.

(21) Appl. No.: 16/978,282

(22) PCT Filed: Dec. 12, 2018

(86) PCT No.: PCT/JP2018/045732
§ 371 (c)(1),
(2) Date: Sep. 4, 2020

(87) PCT Pub. No.: WO2019/171698
PCT Pub. Date: Sep. 12, 2019

(65) Prior Publication Data
US 2020/0411809 A1     Dec. 31, 2020

(30) Foreign Application Priority Data
Mar. 9, 2018 (JP) ................. 2018-042897

(51) Int. Cl.
*H01M 50/186* (2021.01)
*H01M 50/184* (2021.01)
(Continued)

(52) U.S. Cl.
CPC ....... *H01M 50/186* (2021.01); *H01M 50/184* (2021.01); *H01M 50/193* (2021.01); *H01M 50/50* (2021.01); *H01M 50/552* (2021.01)

(58) Field of Classification Search
None
See application file for complete search history.

(56) References Cited

U.S. PATENT DOCUMENTS

2003/0072998 A1*  4/2003  Fredriksson ........ H01M 10/044
                                                         429/185
2009/0263709 A1* 10/2009  Nakamura .............. H01M 4/70
                                                         429/162

(Continued)

FOREIGN PATENT DOCUMENTS

JP     2011-204386 A    10/2011
JP     2013-232374 A    11/2013
(Continued)

OTHER PUBLICATIONS

International Preliminary Report on Patentability with translation of Written opinion dated Sep. 15, 2020, in Application No. PCT/JP2018/045732.

(Continued)

*Primary Examiner* — Haixia Zhang
(74) *Attorney, Agent, or Firm* — Sughrue Mion, PLLC (57) ABSTRACT

A power storage device includes a power storage module and a pair of conductive plates configured to sandwich the power storage module. The power storage module has an electrode laminate and a sealing body configured to seal the electrode laminate. The electrode laminate includes a plu- (Continued)

rality of laminated bipolar electrodes and a pair of terminal electrodes. The pair of terminal electrodes is disposed at laminate ends of the electrode laminate and each includes an electrode plate. The sealing body has a pair of resin portions provided at the edge portions of the terminal electrodes. At least one conductive plate of the pair of conductive plates is disposed to oppose the terminal electrode in the laminating direction of the electrode laminate and to overlap a corresponding resin portion of the pair of resin portions when seen in the laminating direction.

15 Claims, 4 Drawing Sheets

(51) Int. Cl.
*H01M 50/193* (2021.01)
*H01M 50/50* (2021.01)
*H01M 50/552* (2021.01)

(56) References Cited

U.S. PATENT DOCUMENTS

2015/0125738 A1    5/2015  Hirose
2017/0309884 A1*  10/2017  Honda ................. H01M 4/623

FOREIGN PATENT DOCUMENTS

JP    2017-16825 A    1/2017
WO   2009/060697 A1   5/2009

OTHER PUBLICATIONS

International Search Report for PCT/JP2018/045732 dated Feb. 12, 2019 [PCT/ISA/210].

* cited by examiner

POWER STORAGE DEVICE

CROSS REFERENCE TO RELATED APPLICATIONS

This application is a National Stage of International Application No. PCT/JP2018/045732 filed Dec. 12, 2018, claiming priority based on Japanese Patent Application No. 2018-042897 filed Mar. 9, 2018.

TECHNICAL FIELD

One aspect of the present disclosure relates to a power storage device.

BACKGROUND ART

As a power storage device of the related art, known is a power storage device including a so-called bipolar-type power storage module having a bipolar electrode in which a positive electrode is formed on one surface of an electrode plate and a negative electrode is formed on the other surface (refer to Patent Literature 1). Such a power storage module includes an electrode laminate formed by laminating a plurality of bipolar electrodes. In the circumference of the electrode laminate, a sealing body configured to seal portions between the bipolar electrodes adjacent to each other in the laminating direction is provided. In internal spaces formed by the sealing body between the bipolar electrodes, an electrolytic solution is accommodated.

CITATION LIST

Patent Literature

[Patent Literature 1] Japanese Unexamined Patent Publication No. 2011-204386

SUMMARY OF INVENTION

Technical Problem

In the above-described power storage module, there is a case where an internal pressure of the internal space between the bipolar electrodes increases depending on the operation condition or the like. When the internal pressure increases, it is conceivable that an electrode positioned at one laminate end of the electrode laminate (hereinafter, referred to as terminal electrode) significantly deforms toward the outside of the electrode laminate along the laminating direction.

When the terminal electrode excessively deforms, a stress that is applied to the sealing body increases, and there is a concern that the sealing body may break. There is another concern that a gap may be generated between the sealing body and the terminal electrode. The breakage of the sealing body may cause the leakage of the electrolytic solution to the outside of the electrode laminate. The formation of the gap between the sealing body and the terminal electrode may also cause a leakage of the electrolytic solution to the outside of the electrode laminate.

One aspect of the present disclosure has been made to solve the above-described problem and provides a power storage device capable of minimizing the excessive deformation of a terminal electrode even when the internal pressure increases.

Solution to Problem

A power storage device according to one aspect of the present disclosure includes a power storage module and a pair of conductive plates configured to sandwich the power storage module. The power storage module has an electrode laminate and a sealing body configured to seal the electrode laminate. The electrode laminate includes a plurality of laminated bipolar electrodes and a pair of terminal electrodes. The pair of terminal electrodes is disposed at laminate ends of the electrode laminate and each includes an electrode plate and an active material layer. The active material layer is provided on the surface of the electrode plate that opposes the inside of the electrode laminate. The sealing body has a pair of resin portions provided at the edge portions of the terminal electrodes. At least one conductive plate of the pair of conductive plates is disposed to oppose a corresponding terminal electrode of the pair of the terminal electrodes in a laminating direction of the electrode laminate and to overlap a corresponding resin portion of the pair of resin portions when seen in the laminating direction.

In this power storage device, at least one conductive plate is disposed to overlap a corresponding resin portion. Therefore, even when the internal pressure of the power storage module increases, an excessive deformation of the terminal electrode can be suppressed by the conductive plate.

The one conductive plate may be disposed to overlap a corresponding resin portion throughout an entire circumference of the edge portion of the corresponding terminal electrode when seen in the laminating direction. In this case, it is possible to further suppress the excessive deformation of the terminal electrode with the conductive plate.

A length of an edge portion of the electrode laminate in the laminating direction may be shorter than a length of a central portion of the electrode laminate in the laminating direction. In this case, even when the resin portion is provided on the surface of the electrode plate of the terminal electrode that opposes the outside of the electrode laminate, it is possible to bring the conductive plate into contact with the terminal electrode.

The one conductive plate may be in contact with the corresponding resin portion. In this case, it is possible to further suppress the excessive deformation of the terminal electrode with the conductive plate.

Each of the pair of conductive plates may be disposed to oppose each of the pair of terminal electrodes in the laminating direction of the electrode laminate and to overlap each of the pair of resin portions when seen in the laminating direction. In this case, it is possible to suppress the excessive deformation of the pair of terminal electrodes with the pair of conductive plates.

Advantageous Effects of Invention

According to one aspect of the present disclosure, it is possible to suppress the excessive deformation of the terminal electrode even when the internal pressure increases.

DESCRIPTION OF EMBODIMENTS

Hereinafter, an embodiment will be described in detail with reference to the accompanying drawings. In the description, the same reference sign will be used for the same element or elements having the same function, and the elements will not be described repeatedly.
[Configuration of Power Storage Device]

Figure 1:
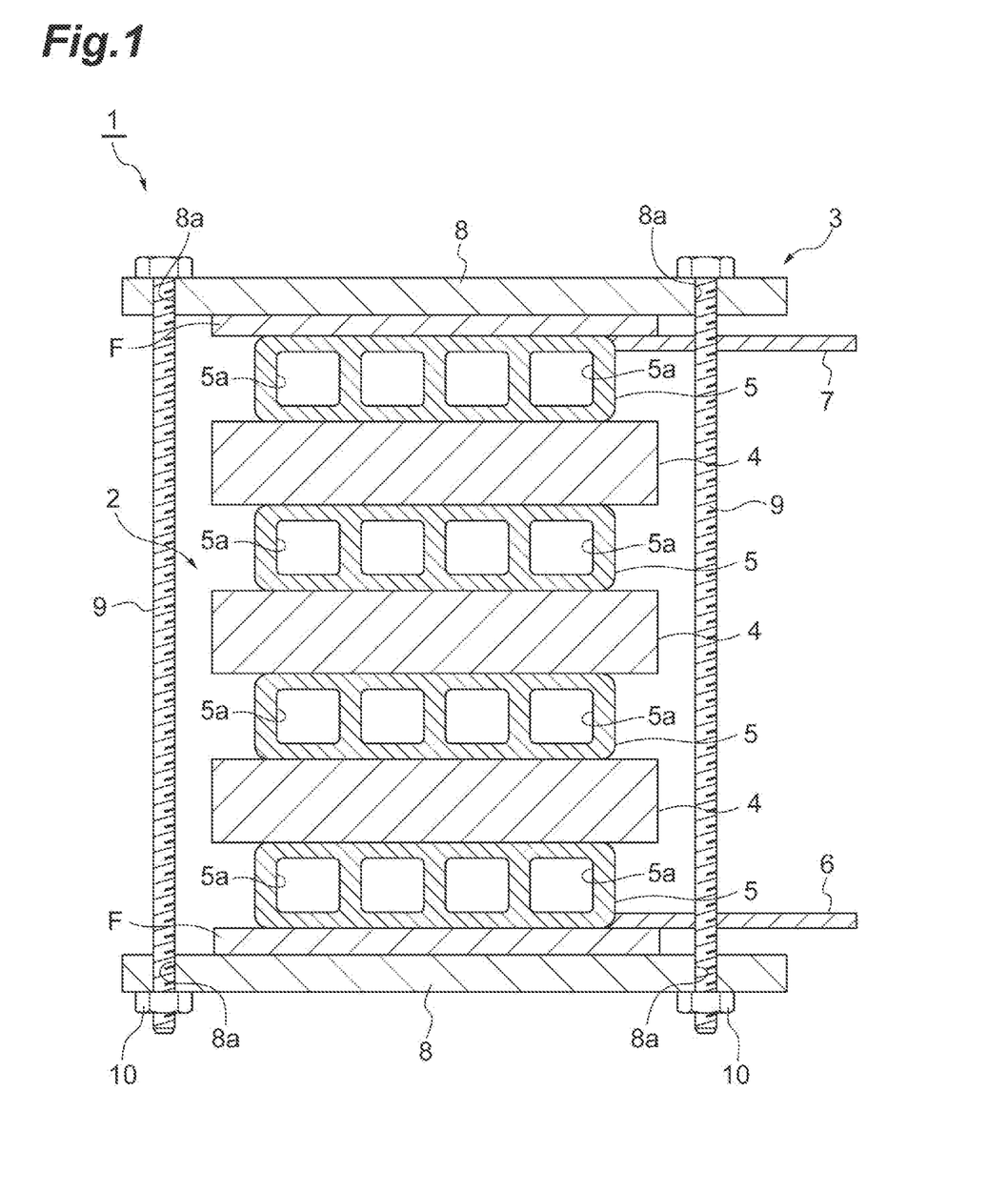
FIG. 1 is a schematic sectional view showing a power storage device according to an embodiment.

FIG. 1 is a schematic sectional view showing a power storage device according to an embodiment. A power storage device 1 shown in the same drawing is used as a battery for a variety of vehicles, for example, a forklift, a hybrid vehicle, an electric vehicle, and the like. The power storage device 1 includes a power storage module laminate 2 including a plurality of laminated power storage modules 4 and a restraining member 3 configured to apply a restraining load to the power storage module laminate 2 in a laminating direction.

The power storage module laminate 2 includes, for example, a plurality of (three in the present embodiment) power storage modules 4 and a plurality of (four in the present embodiment) conductive plates 5. The power storage module 4 is, for example, a bipolar battery including a bipolar electrode 14 described below. The power storage module 4 has a rectangular shape when seen in the laminating direction. The power storage module 4 is, for example, at least one of a secondary battery, such as a nickel metal hybrid secondary battery or a lithium ion secondary battery, and an electric double layer capacitor. In the following description, a nickel metal hybrid secondary battery will be exemplified.

In the power storage module laminate 2, the power storage modules 4 and 4 adjacent to each other in the laminating direction are electrically connected to each other through the conductive plate 5. The conductive plates 5 are disposed between the power storage modules 4 and 4 adjacent to each other in the laminating direction and on the outside of the power storage modules 4 positioned at the laminate ends, respectively. It can be said that each power storage module 4 is sandwiched by a pair of the conductive plates 5. A positive electrode terminal 6 is connected to one conductive plate 5 that is disposed on the outside of the power storage module 4 positioned at one laminate end. A negative electrode terminal 7 is connected to the other conductive plate 5 disposed on the outside of the power storage module 4 positioned at the other laminate end. The positive electrode terminal 6 and the negative electrode terminal 7 are drawn, for example, from the edge portions of the conductive plates 5 in a direction intersecting the laminating direction. With the positive electrode terminal 6 and the negative electrode terminal 7, the power storage device 1 is charged and discharged.

In each of the conductive plates 5, a plurality of flow paths 5a through which a coolant such as an air is circulated is provided. Each flow path 5a extends parallel to, for example, a direction that is orthogonal to the laminating direction and the drawing direction of the positive electrode terminal 6 and the negative electrode terminal 7, respectively. When the coolant is circulated through these flow paths 5a, the conductive plate 5 has not only a function as a connection member configured to electrically connect the power storage modules 4 and 4 but also a function as a heat dissipation plate configured to dissipate heat generated from the power storage module 4. The area of the conductive plate 5 seen in the laminating direction is smaller than, for example, the area of the power storage module 4.

The restraining member 3 includes a pair of end plates 8 and 8 configured to interpose the power storage module laminate 2 in the laminating direction and fastening bolts 9 and nuts 10 configured to fasten the end plates 8 and 8. The end plate 8 is a rectangular metal plate having an area slightly larger than the area of the power storage module 4 and the area of the conductive plate 5 when seen in the laminating direction. An electrically insulating film F is provided on the inner surface (the surface on the power storage module laminate 2 side) of the end plate 8, and the end plate 8 and the conductive plate 5 are electrically insulated.

In an edge portion of the end plate 8, an insertion hole 8a is provided at a position that is the outside of the power storage module laminate 2. The fastening bolt 9 is passed from the insertion hole 8a of one end plate 8 toward the insertion hole 8a of the other end plate 8, and the nut 10 is screwed into the distal end portion of the fastening bolt 9 protruding from the insertion hole 8a of the other end plate 8. As a result, the power storage modules 4 and the conductive plates 5 are interposed by the end plates 8 and 8 to form a unit as the power storage module laminate 2, and a restraining load is applied to the power storage module laminate 2 in the laminating direction.
[Configuration of Power Storage Module]

Figure 2:
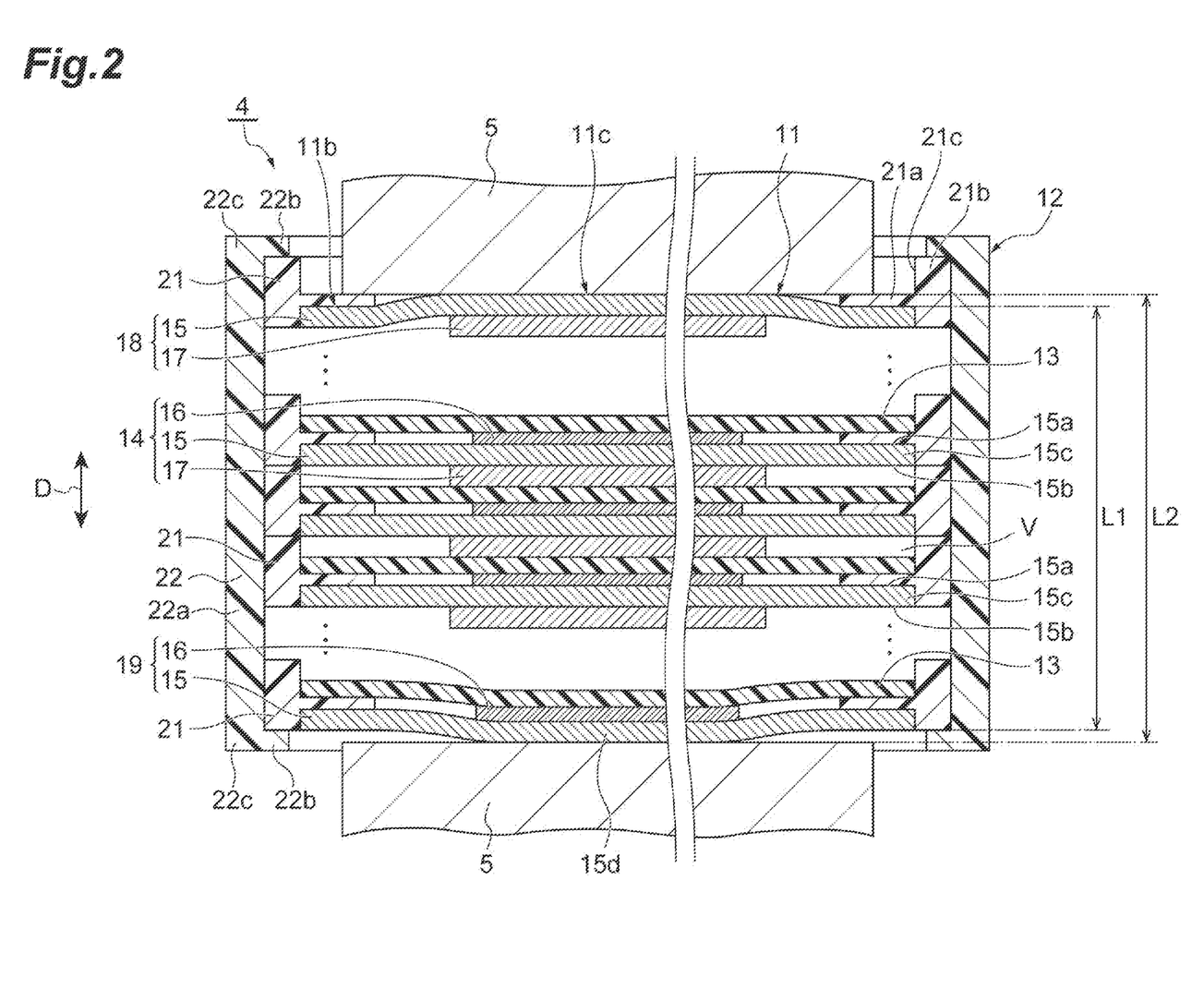
FIG. 2 is a schematic sectional view showing a power storage module according to the embodiment.

Next, the configuration of the power storage module 4 will be described. FIG. 2 is a schematic sectional view showing the power storage module according to the embodiment. As shown in the drawing, the power storage module 4 has an electrode laminate 11 and a resin sealing body 12 configured to seal the electrode laminate 11.

The electrode laminate 11 is configured by laminating a plurality of bipolar electrodes 14, a negative electrode terminal electrode 18, and a positive electrode terminal electrode 19 through separators 13. That is, the electrode laminate 11 includes the plurality of bipolar electrodes 14, the negative electrode terminal electrode 18, and the positive electrode terminal electrode 19 that are laminated through the separators 13. In the present embodiment, a laminating direction D of the electrode laminate 11 and the laminating direction of the power storage module laminate 2 match. The electrode laminate 11 has side surfaces 11a that extend in the laminating direction D. The bipolar electrode 14 includes an electrode plate 15, a positive electrode 16 provided on a first surface 15a of the electrode plate 15, and a negative electrode 17 provided on a second surface 15b of the electrode plate 15. The positive electrode 16 is a positive electrode active material layer formed by the application of a positive electrode active material. The negative electrode 17 is a negative electrode active material layer formed by the application of a negative electrode active material. In the electrode laminate 11, the positive electrode 16 in one bipolar electrode 14 opposes the negative electrode 17 in the other bipolar electrode 14 adjacent to the one bipolar electrode in the laminating direction D with the separator 13 therebetween. In the electrode laminate 11, the negative electrode 17 in one bipolar electrode 14 opposes the positive electrode 16 in the other bipolar electrode 14 adjacent to the one bipolar electrode in the laminating direction D with the separator 13 therebetween.

The negative electrode terminal electrode 18 is disposed at one laminate end of the electrode laminate 11. The negative electrode terminal electrode 18 includes the electrode plate 15 and the negative electrode 17 provided on the second surface 15b of the electrode plate 15. The first surface 15a of the electrode plate 15 in the negative electrode terminal electrode 18 is a surface (outer surface) that opposes the outside of the electrode laminate 11, and the second surface 15b is a surface (inner surface) that opposes the inside of the electrode laminate 11. The negative electrode 17 in the negative electrode terminal electrode 18 opposes the positive electrode 16 in the bipolar electrode 14 through the separator 13.

The positive electrode terminal electrode 19 is disposed at the other laminate end of the electrode laminate 11. The positive electrode terminal electrode 19 includes the electrode plate 15 and the positive electrode 16 provided on the first surface 15a of the electrode plate 15. The first surface 15a of the electrode plate 15 in the positive electrode terminal electrode 19 is a surface (inner surface) that opposes the inside of the electrode laminate 11, and the second surface 15b is a surface (outer surface) that opposes the outside of the electrode laminate 11. The positive electrode 16 in the positive electrode terminal electrode 19 opposes the negative electrode 17 in the bipolar electrode 14 through the separator 13.

The electrode plate 15 is formed of, for example, a metal foil formed of nickel or a nickel-plated steel plate and has a rectangular shape. An edge portion 15c of the electrode plate 15 is a region (non-applied region) in which neither the positive electrode active material nor the negative electrode active material is provided on the first surface 15a and the second surface 15b. A central portion 15d surrounded by the edge portions 15c of the electrode plate 15 is a region (applied region) in which at least one of the positive electrode active material or the negative electrode active material is provided on at least one of the first surface 15a and the second surface 15b. The central portion 15d configures an electrode portion in each of the bipolar electrode 14, the negative electrode terminal electrode 18, and the positive electrode terminal electrode 19.

Examples of the positive electrode active material that forms the positive electrode 16 include nickel hydroxide. Examples of the negative electrode active material that forms the negative electrode 17 include a hydrogen storage alloy. In the present embodiment, a region where the negative electrode 17 is formed on the second surface 15b of the electrode plate 15 is slightly larger than a region where the positive electrode 16 is formed on the first surface 15a of the electrode plate 15. Therefore, the size of the central portion 15d of the bipolar electrode 14 is the size of the region where the negative electrode 17 is formed on the second surface 15b of the electrode plate 15.

The separator 13 is formed in, for example, a sheet shape. Examples of the separator 13 include a porous film formed of a polyolefin-based resin such as polyethylene (PE) or polypropylene (PP), fabric or non-woven fabric formed of polypropylene, polyethylene terephthalate (PET), methyl cellulose, or the like, and the like. The separator 13 may be a separator reinforced with a vinylidene fluoride resin compound. The separator 13 is not limited to the sheet shape, and a separator having a bag shape may be used.

In the electrode laminate 11, the sealing body 12 seals the portions between the bipolar electrodes 14 and 14 adjacent to each other in the laminating direction D, the portion between the negative electrode terminal electrode 18 and the bipolar electrode 14 adjacent to each other in the laminating direction D, and the portion between the positive electrode terminal electrode 19 and the bipolar electrode 14 adjacent to each other in the laminating direction D. The sealing body 12 is formed of, for example, an insulating resin in a rectangular cylindrical shape. The sealing body 12 is configured to hold the edge portions 15c of the electrode plates 15 on the side surfaces 11a of the electrode laminate 11 that extend in the laminating direction D and to surround the side surfaces 11a.

The sealing body 12 includes first resin portions 21 and second resin portions 22. The first resin portions 21 are provided at the edge portions 15c of the respective electrode plates 15 in the bipolar electrodes 14, the negative electrode terminal electrode 18, and the positive electrode terminal electrode 19, and the second resin portions 22 are provided to surround all of the first resin portions 21 from the outside. The first resin portion 21 is formed by, for example, the injection molding of a resin and is continuously provided throughout all of the sides of the electrode plate 15 at the edge portions 15c (non-applied region) on the first surface 15a side of the electrode plate 15. The first resin portion 21 is strongly bonded to the edge portion 15c by, for example, welding using ultrasonic waves or heat. The first resin portion 21 seals the electrode laminate 11 and also functions as a spacer between the electrode plates 15 and 15 adjacent to each other in the laminating direction D.

The first resin portion 21 has a first part 21a that overlaps the edge portion 15c of the electrode plate 15 when seen in the laminating direction D and a second part 21b that overhangs the outside of the edge of the electrode plate 15. The length of the second part 21b in the laminating direction D is longer than the length of the first part 21a in the laminating direction D. Therefore, the first resin portion 21 has a riser surface 21c between the first part 21a and the second part 21b. The riser surface 21c covers the entire end surface of the electrode plate 15 (that is, a part of the side surface 11a). The first resin portion 21 is provided apart from the positive electrode 16 and the negative electrode 17 in a direction orthogonal to the laminating direction D.

In the bonding of the first resin portion 21 and the electrode plate 15, the bonding surface of the electrode plate 15 with the first resin portion 21 is a roughening-plated surface provided with a plurality of fine protrusions. In the present embodiment, the entire surface of the first surface 15a of the electrode plate 15 that is provided with the positive electrode 16 is a roughening-plated surface. The fine protrusion is, for example, a protrusion-like metallic deposit (including an imparted substance) formed by electroplating carried out on the electrode plate 15. On the roughening-plated surface, the resin material that forms the first resin portion 21 enters gaps between the fine protrusions, whereby an anchor effect is generated, and the bonding strength and the liquid tightness between the electrode plate 15 and the first resin portion 21 improve.

The second resin portion 22 surrounds the first resin portion 21 from the outside and configures an outer wall (housing) of the power storage module 4. The second resin portion 22 is formed by, for example, the injection molding of a resin and extends throughout the entire length of the electrode laminate 11 in the laminating direction D. The second resin portion 22 has a side surface part 22a and a pair of overhang parts 22b. The side surface part 22a is provided along the side surface 11a of the electrode laminate 11 and bonds the plurality of first resin portions 21 arranged in the laminating direction D together. The overhang part 22b overhangs the end surface of the second part 21b of the first resin portion 21 in the laminating direction D from an end portion 22c of the side surface part 22a in the laminating direction D. The overhang part 22b is continuously provided throughout all of the sides of the electrode plate 15. The second resin portion 22 is welded to the outer surface of the first resin portion 21 with, for example, heat generated during the injection molding.

The resin that forms the first resin portion 21 and the resin that forms the second resin portion 22 are resins that are compatible with each other, for example, the same resin. Examples of the resin that forms the first resin portion 21 and the secondary sealing body include polypropylene (PP), polyphenylene sulfide (PPS), modified polyphenylene ether (modified PPE), and the like.

An internal space V that is determined by the interval between the first resin portions 21 and 21 in the laminating direction D is formed between the electrode plates 15 and 15. In the internal spaces V, an electrolytic solution E formed of for example, an alkali solution such as an aqueous potassium hydroxide solution is accommodated. The separators 13, the positive electrodes 16, and the negative electrodes 17 are impregnated with the electrolytic solution E. In the sealing body 12, a plurality of communication holes (not shown) that communicates with each internal space V is provided. The communication hole functions as a liquid injection port for injecting the electrolytic solution E into each internal space V and also functions as, after the injection of the electrolytic solution E, a connection port for a pressure adjusting valve (not shown).

Next, the positional relationship between the conductive plate 5 and the power storage module 4 will be described. As described above, the power storage module 4 is sandwiched by the pair of conductive plates 5. A first conductive plate 5 is disposed to oppose the first surface 15a in the negative electrode terminal electrode 18 in the laminating direction D and to overlap the first resin portion 21 provided at the edge portion 15c in the negative electrode terminal electrode 18 when seen in the laminating direction D (hereinafter, the first resin portion 21 in the negative electrode terminal electrode 18). Specifically, the outer edge portion of the first conductive plate 5 overlaps the inner edge portion of the first part 21a of the first resin portion 21 in the negative electrode terminal electrode 18 when seen in the laminating direction D. The first conductive plate 5 is disposed to overlap the first resin portion 21 in the negative electrode terminal electrode 18 throughout the entire circumference of the edge portion 15c in the negative electrode terminal electrode 18 when seen in the laminating direction D.

The second conductive plate 5 is disposed to oppose the second surface 15b in the positive electrode terminal electrode 19 in the laminating direction D and to overlap the first resin portion 21 provided at the edge portion 15c in the positive electrode terminal electrode 19 when seen in the laminating direction D (hereinafter, the first resin portion 21 in the positive electrode terminal electrode 19). Specifically, the outer edge portion of the second conductive plate 5 overlaps the inner edge portion of the first part 21a of the first resin portion 21 in the positive electrode terminal electrode 19 when seen in the laminating direction D. The first conductive plate 5 is disposed to overlap the first resin portion 21 in the positive electrode terminal electrode 19 throughout the entire circumference of the edge portion 15c in the positive electrode terminal electrode 19 when seen in the laminating direction D.

In the power storage module 4, the electrode laminate 11 forms a shape swelling in the laminating direction D in a central portion 11c rather than in an edge portion 11b. That is, the length L1 of the edge portion 11b of the electrode laminate 11 in the laminating direction D is shorter than the length L2 of the central portion 11c of the electrode laminate 11 in the laminating direction D. Therefore, the central portion 15d in the negative electrode terminal electrode 18 on the first surface 15a side is in contact with the first conductive plate 5 adjacent to the power storage module 4 in the laminating direction D. The central portion 15d in the positive electrode terminal electrode 19 on the second surface 15b side is in contact with the second conductive plate 5 adjacent to the power storage module 4 in the laminating direction D.

The edge portion 11b of the electrode laminate 11 includes the edge portion 15c of each electrode plate 15. The central portion 11c of the electrode laminate 11 includes the central portion 15d of each electrode plate 15 and configures an electrode portion of the electrode laminate 11. The shape of the electrode laminate 11 in which the length L1 is shorter than the length L2 is obtained by adjusting the thicknesses (lengths in the laminating direction D) of the first resin portion 21, the electrode plate 15, the positive electrode 16, the negative electrode 17, and the separator 13. Specifically, the thicknesses are adjusted such that the thickness of the second part 21b of the first resin portion 21 becomes smaller than the sum of the thicknesses of the electrode plate 15, the positive electrode 16, the negative electrode 17, and the separator 13.

The swell amount of the central portion 15d with respect to the edge portion 15c in the negative electrode terminal electrode 18 (the separation distance, in the laminating direction D, between the edge portion 15c on the first surface 15a side and the central portion 15d on the first surface 15a side in the negative electrode terminal electrode 18) is equal to or more than the thickness (the length in the laminating direction D) of the first part 21a of the first resin portion 21 of the negative electrode terminal electrode 18 and is, for example, 0.2 mm. Therefore, it is possible to bring the central portion 15d of the negative electrode terminal electrode 18 into contact with the first conductive plate 5 without being caught by the first part 21a. As described above, in the electrode laminate 11 of the power storage module 4, the electrode plates 15 are laminated in a slightly deformed state. The amount of deformation of the electrode plate 15 increases toward the laminate end from the intermediate layers of the electrode laminate 11. In the present embodiment, the first conductive plate 5 is also in contact with the first part 21a. The pair of conductive plates 5 are not in contact with the second resin portion 22.

The swell amount of the central portion 15d with respect to the edge portion 15c in the positive electrode terminal electrode 19 (the separation distance, in the laminating direction D, between the edge portion 15c on the second surface 15b side and the central portion 15d on the second surface 15b side in the positive electrode terminal electrode 19) is, for example, equal to the swell amount of the central portion 15d with respect to the edge portion 15c of the negative electrode terminal electrode 18.

Figure 3:
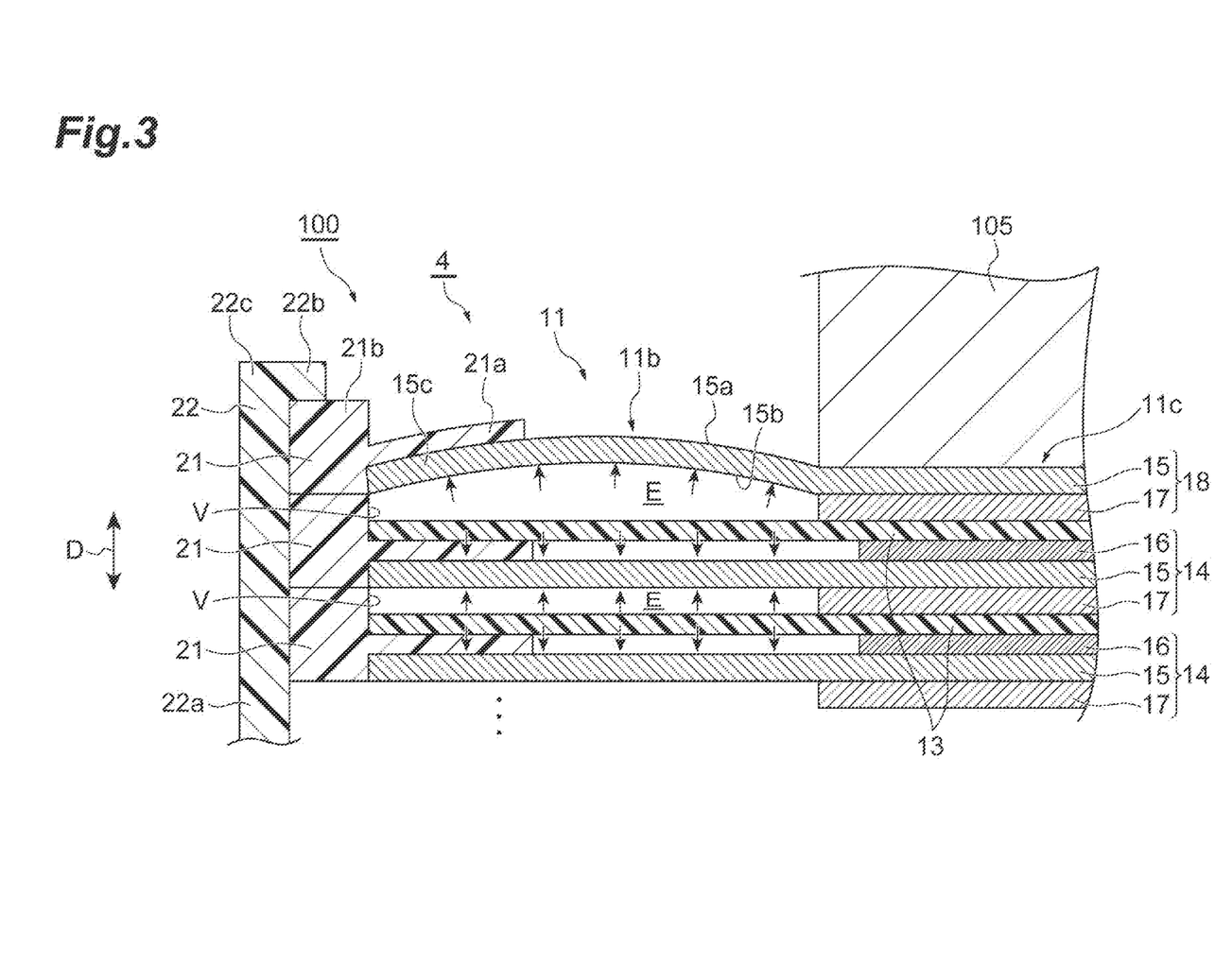
FIG. 3 is an enlarged cross-sectional view of an essential part showing an appearance of a negative electrode terminal electrode when the internal pressure of a power storage module in a power storage device according to a reference example increases.
Figure 4:
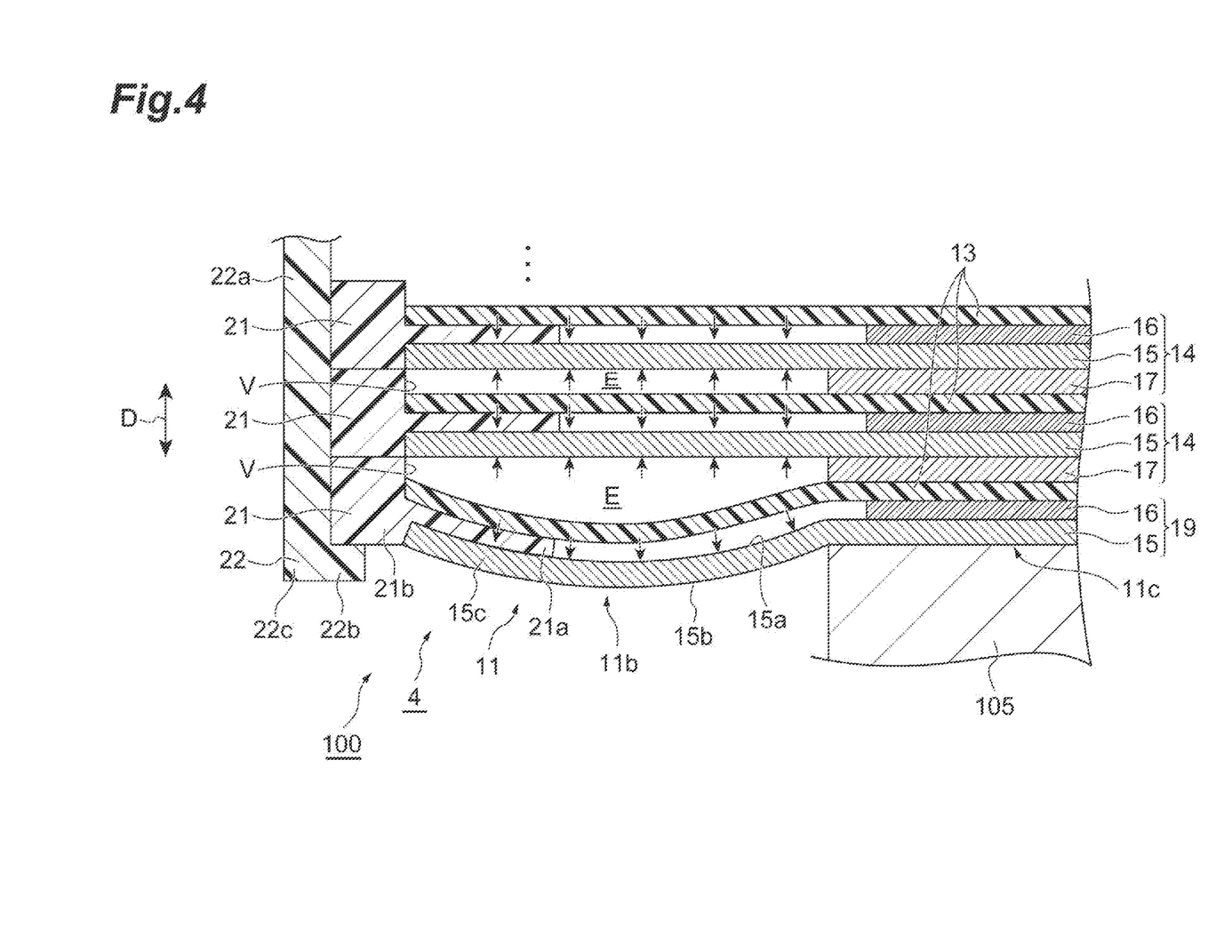
FIG. 4 is an enlarged cross-sectional view of an essential part showing an appearance of a positive electrode terminal electrode when the internal pressure of the power storage module in the power storage device according to the reference example increases.

FIG. 3 is an enlarged cross-sectional view of an essential part showing the appearance of a negative electrode terminal electrode when the internal pressure of a power storage module in a power storage device according to a reference example increases. FIG. 4 is an enlarged cross-sectional view of an essential part showing the appearance of a positive electrode terminal electrode when the internal pressure of the power storage module in the power storage device according to the reference example increases. In a power storage device 100 according to the reference example, unlike the power storage device 1 according to the embodiment, a pair of conductive plates 105 is disposed so as not to overlap the first resin portions 21 provided at the edge portions 15c of the negative electrode terminal electrode 18 and the positive electrode terminal electrode 19 that oppose each other in the laminating direction D (hereinafter, the first resin portions 21 of a pair of the terminal electrodes) when seen in the laminating direction D. The pair of conductive plates 105 is slightly smaller than the conductive plate 5 of the embodiment when seen in the laminating direction D. The pair of conductive plates 105 is separated from the first resin portions 21 in the direction orthogonal to the laminating direction D. The pair of conductive plates 105 is as large as, for example, the central portion 11c of the electrode laminate 11 when seen in the laminating direction D. The pair of conductive plates 105 is disposed to sandwich the central portions 11c of the electrode laminate 11. The pair of conductive plates 105 is in contact with the central portions 11c of the electrode laminate 11.

In the power storage device 100, when the internal pressures of the internal spaces V between the electrode plates 15 and 15 in the power storage module 4 increase due to the operation conditions or the like, in the intermediate layers of the electrode laminate 11, a load generated by the internal pressures of the internal spaces V adjacent to each other in the laminating direction D is canceled. Since the internal space V itself is also a small space, the deformation of the bipolar electrode 14 is relatively difficult to occur.

On the other hand, in the negative electrode terminal electrode 18 and the positive electrode terminal electrode 19 that are positioned at the laminate ends of the electrode laminate 11, unlike the intermediate layers, a load generated by the internal pressures of the internal spaces V is not canceled. Therefore, it is possible to consider that, when the internal pressure increases, the negative electrode terminal electrode 18 and the positive electrode terminal electrode 19 excessively deform toward the outside of the electrode laminate 11 along the laminating direction D as shown in FIG. 3 and FIG. 4. When the negative electrode terminal electrode 18 and the positive electrode terminal electrode 19 excessively deform, excess stresses are applied to the first resin portions 21, and there is a concern that the first resin portions 21 may break. There is another concern that gaps may be generated between the first resin portion 21 and the negative electrode terminal electrode 18 and between the first resin portion 21 and the positive electrode terminal electrode 19. Particularly, the first resin portion 21 is likely to break in the boundary portion between the part covered with the overhang part 22b of the second resin portion 22 and the part not covered with the overhang part 22b. The breakage of the first resin portion 21 may cause the leakage of the electrolytic solution E to the outside of the electrode laminate 11. The formation of the gaps between the first resin portion 21 and the negative electrode terminal electrode 18 and between the first resin portion 21 and the positive electrode terminal electrode 19 may also cause the leakage of the electrolytic solution E to the outside of the electrode laminate 11.

On the other hand, in the power storage device 1, the pair of conductive plates 5 is disposed to overlap the first resin portions 21 of the pair of terminal electrodes when seen in the laminating direction D. Therefore, even when the internal pressure of the power storage module 4 increases, the excessive deformation of the negative electrode terminal electrode 18 and the positive electrode terminal electrode 19 can be suppressed by the conductive plates 5. Therefore, it is possible to suppress the breakage of the first resin portion 21. The formation of the gaps between the first resin portion 21 and the negative electrode terminal electrode 18 and between the first resin portion 21 and the positive electrode terminal electrode 19 can also be suppressed. As a result, it is possible to prevent the leakage of the electrolytic solution E to the outside of the electrode laminate 11.

The pair of conductive plates 5 is disposed to overlap the first resin portions 21 throughout the entire circumferences of the edge portions 15c in the negative electrode terminal electrode 18 and the positive electrode terminal electrode 19 when seen in the laminating direction D. Therefore, the excessive deformation of the negative electrode terminal electrode 18 and the positive electrode terminal electrode 19 can be further suppressed by the pair of conductive plates 5.

The length L1 of the edge portion 11b of the electrode laminate 11 in the laminating direction D is shorter than the length L2 of the central portion 11c of the electrode laminate 11 in the laminating direction D. Therefore, even when the first resin portion 21 is provided at the edge portion 15c of the negative electrode terminal electrode 18 on the first surface 15a side, it is possible to bring the first conductive plate 5 into contact with the central portion 15d of the negative electrode terminal electrode 18 on the first surface 15a side. In the present embodiment, in the positive electrode terminal electrode 19 as well, the first resin portion 21 is provided on the first surface 15a. However, even when the first resin portion 21 is provided on the second surface 15b, the length L1 is shorter than the length L2. Therefore, it is easy to bring the second conductive plate 5 into contact with the positive electrode terminal electrode 19.

The first conductive plate 5 is in contact with the first resin portion 21. Therefore, it is possible to further suppress the excessive deformation of the negative electrode terminal electrode 18 by the first conductive plate 5.

The present disclosure is not limited to the above-described embodiment. For example, the power storage device 1 according to the embodiment includes the plurality of power storage modules 4 and the plurality of conductive plates 5, but the power storage device 1 may include at least one power storage module 4 and a pair of conductive plates 5.

At least any one of the pair of conductive plates 5 may be disposed to overlap the first resin portion 21 of the terminal electrode that opposes the conductive plate 5 in the laminating direction D when seen in the laminating direction D. That is, the other of the pair of conductive plates 5 may not overlap the first resin portion 21 of the terminal electrode that opposes the conductive plate 5 in the laminating direction D when seen in the laminating direction D.

In the above-described embodiment, in all of the bipolar electrodes 14, the negative electrode terminal electrode 18, and the positive electrode terminal electrode 19, the first resin portions 21 having the same shape are provided. Therefore, the pair of conductive plates 5 also overlaps the first resin portions 21 other than the first resin portions 21 in the terminal electrodes that oppose the conductive plates in the laminating direction D, but the pair of conductive plates 5 may not overlap the other first resin portions 21 when seen in the laminating direction D. That is, all of the bipolar electrodes 14, the negative electrode terminal electrode 18, and the positive electrode terminal electrode 19 may not be provided with the first resin portions 21 having the same shape.

REFERENCE SIGNS LIST

1 Power storage device
4 Power storage module
5 Conductive plate
11 Electrode laminate
11b Edge portion 11c Central portion
12 Sealing body
13 Separator
14 Bipolar electrode
15 Electrode plate
15a First surface
15b Second surface
15c Edge portion
16 Positive electrode
17 Negative electrode
18 Negative electrode terminal electrode
19 Positive electrode terminal electrode
21 First resin portion

The invention claimed is:

1. A power storage device, comprising:
a power storage module; and
a pair of conductive plates configured to sandwich the power storage module,
wherein the power storage module has an electrode laminate including a plurality of laminated bipolar electrodes and a pair of terminal electrodes, and a sealing body configured to seal the electrode laminate,
the pair of terminal electrodes is disposed at laminate ends of the electrode laminate and each includes an electrode plate and an active material layer provided on a surface of the electrode plate that faces an inside of the electrode laminate,
the sealing body has a pair of resin portions provided at edge portions of the pair of terminal electrodes,
at least one conductive plate of the pair of conductive plates is disposed to face a corresponding terminal electrode of the pair of terminal electrodes in a laminating direction of the electrode laminate and overlap a corresponding resin portion of the pair of resin portions when seen in the laminating direction,
the at least one conductive plate directly contacts the electrode plate of the corresponding terminal electrodes at a surface that faces away from the electrode laminate,
the active material layer of each terminal electrode is provided only on the surface of the electrode plate that faces the inside of the electrode laminate, and
the at least one conductive plate has a plurality of flow paths extending in a direction perpendicular to the laminating direction and configured to circulate coolant across a length of the at least one conductive plate in the direction perpendicular to the laminating direction.

2. The power storage device according to claim 1,
wherein the one conductive plate is disposed to overlap the corresponding resin portion throughout an entire circumference of the edge portion of the corresponding terminal electrode when seen in the laminating direction.

3. The power storage device according to claim 1,
wherein a length of an edge portion of the electrode laminate in the laminating direction is shorter than a length of a central portion of the electrode laminate in the laminating direction.

4. The power storage device according to claim 1,
wherein the one conductive plate is in contact with the corresponding resin portion.

5. The power storage device according to claim 1,
wherein each of the pair of conductive plates is disposed to oppose each of the pair of terminal electrodes in the laminating direction of the electrode laminate and to overlap each of the pair of resin portions when seen in the laminating direction.

6. The power storage device according to claim 2,
wherein a length of an edge portion of the electrode laminate in the laminating direction is shorter than a length of a central portion of the electrode laminate in the laminating direction.

7. The power storage device according to claim 2,
wherein the one conductive plate is in contact with the corresponding resin portion.

8. The power storage device according to claim 3,
wherein the one conductive plate is in contact with the corresponding resin portion.

9. The power storage device according to claim 2,
wherein each of the pair of conductive plates is disposed to oppose each of the pair of terminal electrodes in the laminating direction of the electrode laminate and to overlap each of the pair of resin portions when seen in the laminating direction.

10. The power storage device according to claim 3,
wherein each of the pair of conductive plates is disposed to oppose each of the pair of terminal electrodes in the laminating direction of the electrode laminate and to overlap each of the pair of resin portions when seen in the laminating direction.

11. The power storage device according to claim 4,
wherein each of the pair of conductive plates is disposed to oppose each of the pair of terminal electrodes in the laminating direction of the electrode laminate and to overlap each of the pair of resin portions when seen in the laminating direction.

12. The power storage device according to claim 1,
wherein the at least one conductive plate overlaps a portion of the corresponding resin portion disposed on a surface of the corresponding terminal electrode that faces away from the electrode laminate.

13. The power storage device according to claim 1,
wherein the pair of resin portions includes a first resin portion disposed on the edge portions of the pair of terminal electrodes and a second resin portion disposed on outward facing edges of the first resin portion.

14. A power storage device, comprising:
a plurality of power storage modules; and
a plurality of stacked conductive plates, each adjacent conductive plate being stacked with one of the plurality of power storage modules interposed therebetween,
wherein each of the power storage modules has an electrode laminate including a plurality of laminated bipolar electrodes and a pair of terminal electrodes, and a sealing body configured to seal the electrode laminate,
the pair of terminal electrodes is disposed at laminate ends of the electrode laminate and each includes an electrode plate and an active material layer provided on a surface of the electrode plate that faces an inside of the electrode laminate,
the sealing body has a pair of resin portions provided at edge portions of the pair of terminal electrodes,
at least one conductive plate of each pair of adjacent conductive plates is disposed to face a corresponding terminal electrode of the pair of terminal electrodes in a laminating direction of the electrode laminate and overlap a corresponding resin portion of the pair of resin portions when seen in the laminating direction,
the at least one conductive plate directly contacts the electrode plate of the corresponding terminal electrode at a surface of the corresponding terminal electrode that faces away from the electrode laminate, the active material layer of each terminal electrode is provided only on the surface of the electrode plate that faces the inside of the electrode laminate, and the at least one conductive plate has a plurality of flow paths extending in a direction perpendicular to the laminating direction and configured to circulate coolant across a length of the at least one conductive plate in the direction perpendicular to the laminating direction.

15. The power storage device according to claim 14, wherein the pair of resin portions includes a first resin portion disposed on the edge portions of the pair of terminal electrodes and a second resin portion disposed on outward facing edges of the first resin portion.

* * * * *